United States Patent [19]
Fischer et al.

[11] 3,718,364
[45] Feb. 27, 1973

[54] VEHICLE BODY AND FRAME CONSTRUCTION

[75] Inventors: Raymond G. Fischer, Birmingham; Marvin H. Henckel, Farmington; Walter V. Corteg, Utica; Gerald E. Frig, Sterling Heights, all of Mich.

[73] Assignee: General Motors Corporation, Detroit, Mich.

[22] Filed: Oct. 26, 1971

[21] Appl. No.: 192,046

[52] U.S. Cl. .............. 296/28 R, 280/106 R, 293/63, 296/146
[51] Int. Cl. ............................................. B62d 21/00
[58] Field of Search ......... 296/28 R, 28 F, 28 G, 146; 280/106 R; 293/62, 63, 64

[56] References Cited

UNITED STATES PATENTS

| | | | |
|---|---|---|---|
| 2,080,714 | 5/1937 | Hicks et al. | 296/146 |
| 2,354,700 | 8/1944 | Pezzano | 293/63 X |
| 3,219,384 | 11/1965 | Graham | 296/28 R |
| 3,520,550 | 7/1970 | Dysarz et al. | 280/106 R |

FOREIGN PATENTS OR APPLICATIONS

| | | | |
|---|---|---|---|
| 846,207 | 8/1960 | Great Britain | 296/28 R |

Primary Examiner—Leo Friaglia
Assistant Examiner—Leslie J. Paperner
Attorney—W. E. Finken et al.

[57] ABSTRACT

An improved frame and body construction for an automobile type vehicle including a frame having a pair of longitudinal horns adapted for energy absorbing deformation, a body front sheet metal portion adapted for energy absorbing collapse, a rigid cowl structure rearward of the front sheet metal portion, a pair of side door impact beams having substantial column rigidity pivotally supported on respective ones of the cowl and a center pillar of the body, and a rear sheet metal portion of the body defining a structurally rigid unit rearward of the passenger compartment. In a relatively high speed collision situation the impact forces on the vehicle are divided between the frame and the sheet metal in a predetermined proportion and distributed above and below the vehicle center of gravity to suppress pitching, the forces on the sheet metal being transferred to the cowl and by the impact beams to the rear sheet metal portion thereby to prevent rearward displacement of the cowl into the passenger compartment.

3 Claims, 4 Drawing Figures

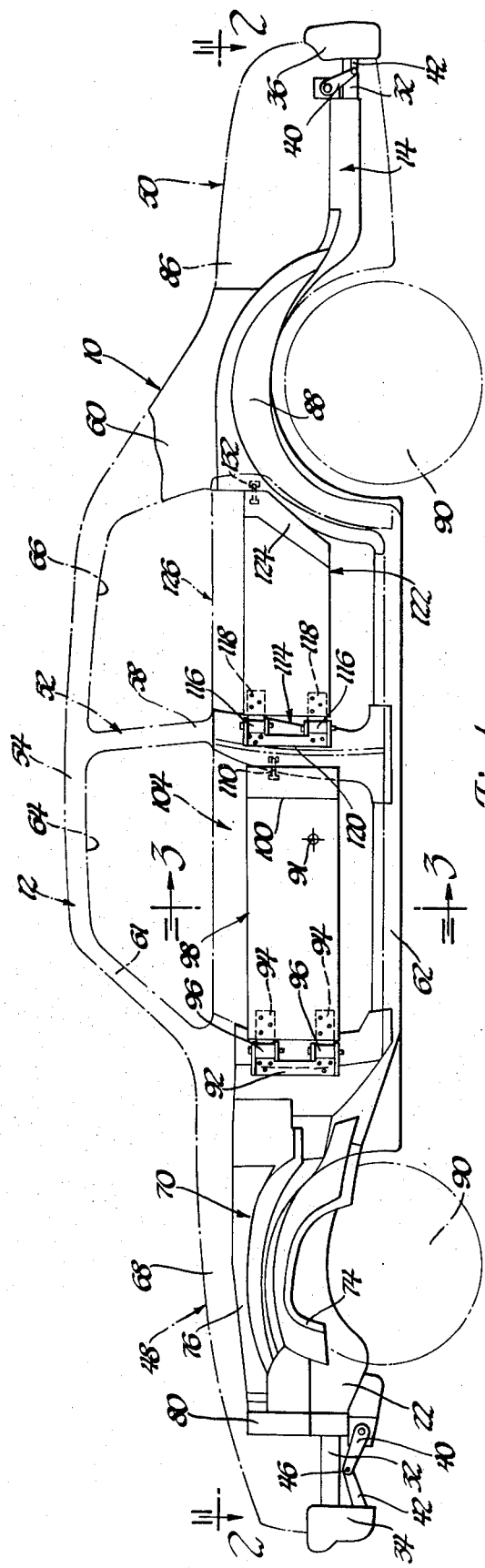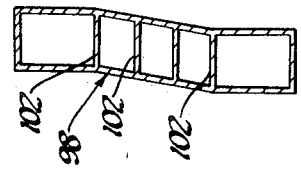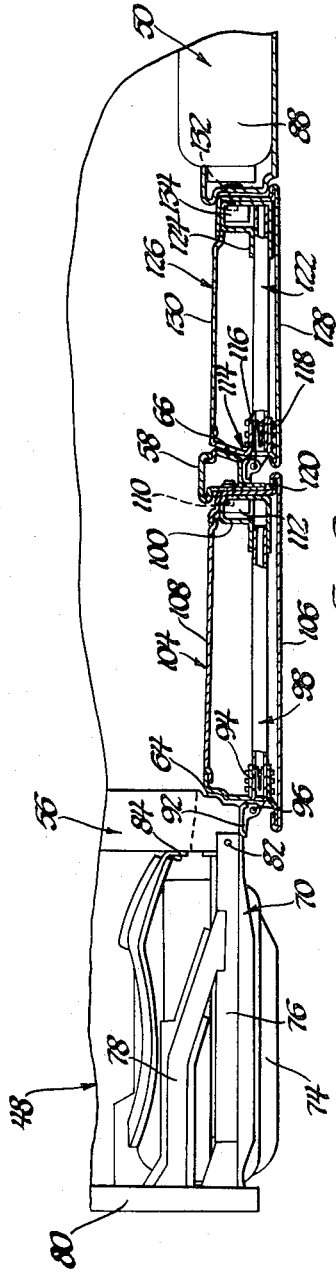

VEHICLE BODY AND FRAME CONSTRUCTION

The invention described herein was made under a contract with the Department of Transportation.

This invention relates generally to automobile type vehicles and more particularly to an improved frame and body construction adapted to maximize passenger protection in high speed collision situations.

For purposes of discussion, the total mass of an automobile type vehicle can be assumed to be concentrated at the center of gravity of the vehicle, hereinafter designated c.g., and reference to acceleration, deceleration, or velocity of the vehicle can be assumed to refer to acceleration or deceleration of the c.g. Accordingly, deceleration of a moving vehicle in a collision situation, as during a collision with a rigid barrier, is governed by the equation $F = ma$ where $F$ is the decelerating force externally exerted on the vehicle, $m$ is mass of the vehicle, and $a$ is the acceleration or deceleration of the vehicle. Further, in the barrier type collision, deceleration does not begin until contact is effected between the barrier and the vehicle so that there is necessarily some relative displacement between the c.g. and the front extremity of the vehicle between the instant of impact and the instant the vehicle achieves zero velocity, the relative displacement being accommodated by deformation of the frame and sheet metal portions of the vehicle between the c.g. and the point of impact. Through extensive research, automotive engineers have determined that in a high speed (approximately 50 mph) collision between a vehicle and a rigid barrier, occupant protection is maximized if the deceleration of the vehicle does not exceed a certain maximum value. Working with this empirical value, for any given vehicle the distance through which the c.g. moves toward the barrier after impact can be determined as can the magnitude of the force necessary to effect that particular deceleration. Obviously, the forces involved will be quite substantial because of the large mass involved and the necessarily rapid deceleration required to stop a vehicle having a velocity of 50 mph. This factor renders extremely difficult the process of reducing to practice a frame and body arrangement which can withstand the force necessary to effect the particular deceleration but which is not so soft nor so rigid as to cause deviation from the desired rate. An improved body and frame construction according to this invention represents a reduction to practice of an arrangement having the above-noted characteristics.

The primary feature of this invention, then, is that it provides an improved automobile body and frame construction particularly adapted to effect deceleration of a moving vehicle at a predetermined rate while maintaining the integrity of the passenger compartment thereby to maximize passenger protection. Another feature of this invention resides in the provision of an improved body and frame construction wherein both the frame and the body of the vehicle cooperate through simultaneous permanent deformation in effecting deceleration of the vehicle at the predetermined rate. Yet another feature of this invention resides in the provision in the improved construction of frame and body sheet metal portions which effectively distribute the impact forces on the vehicle both above and below the c.g. of the latter thereby to minimize the tendency of the vehicle to pitch upon impact. A still further feature of this invention resides in the provision in the improved construction of side door impact beams which are particularly adapted to provide longitudinal structural rigidity for the sides of the passenger compartment and bracing for the sheet metal portions of the body forward of the passenger compartment thereby to reinforce the latter for withstanding the relatively large forces encountered upon impact.

These and other features of this invention will be readily apparent from the following specification and from the drawings wherein:

FIG. 1 is a side elevational view of an automobile type vehicle having an improved frame and body construction according to this invention;

FIG. 2 is a fragmentary sectional view taken generally along the plane indicated by lines 2—2 in FIG. 1;

FIG. 3 is an enlarged sectional view taken generally along the plane indicated by lines 3—3 in FIG. 1.

Figure 4:
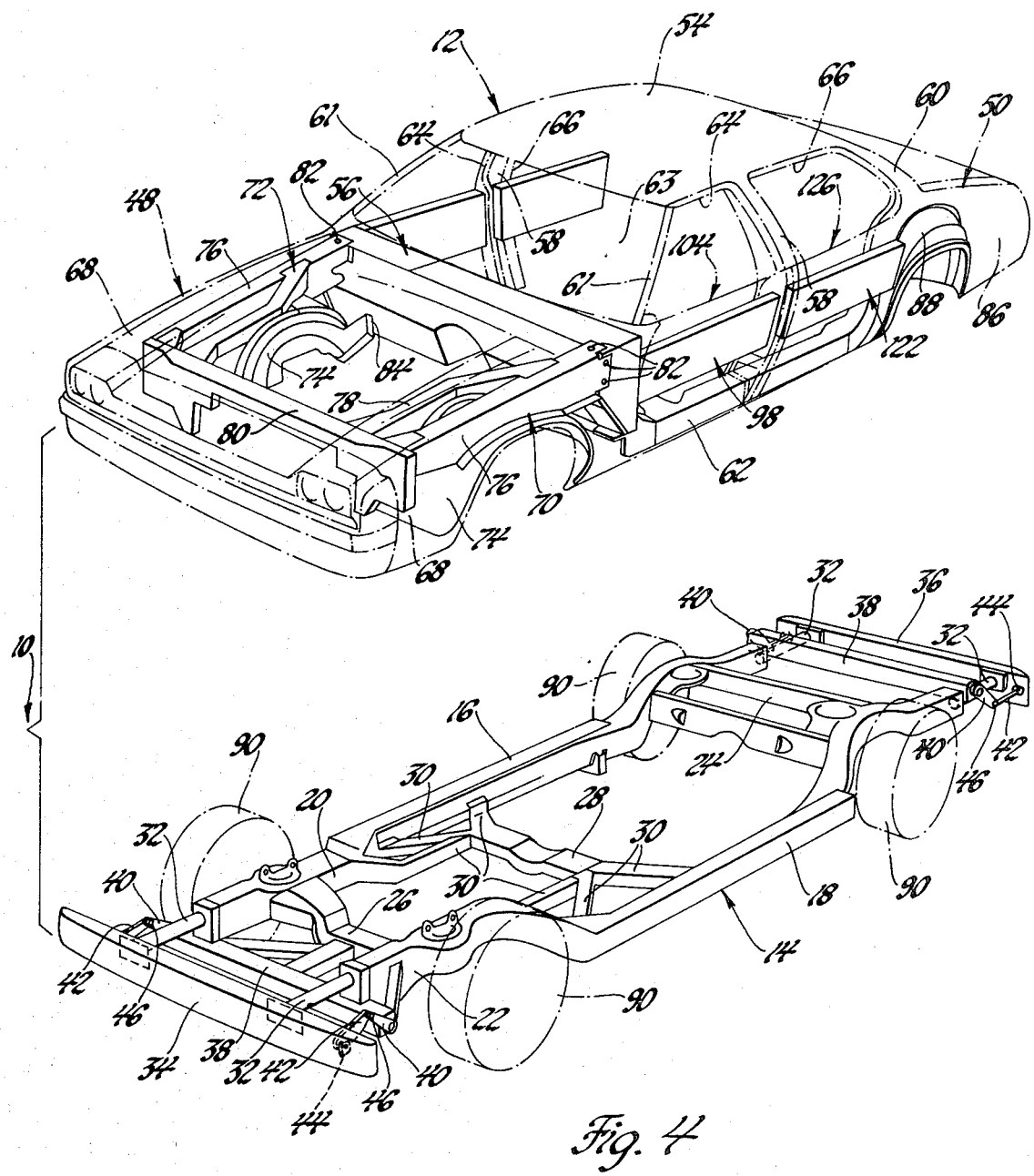
FIG. 4 is an exploded perspective view of an automobile type vehicle having a frame and body construction according to this invention.

Referring now to FIGS. 1 and 4 of the drawings, thereshown is an automobile type vehicle designated generally 10 including a body 12 and a frame 14. As seen best in FIG. 4, the frame 14 includes a pair of structurally rigid longitudinally extending rails 16 and 18 having inwardly offset front portions or horns 20 and 22 respectively. The rear portions of the rails are rigidly interconnected by a rear cross member 24 while the horns 20 and 22 are rigidly interconnected by a front cross member 26. Intermediate the cross members 24 and 26 the rails 16 and 18 are rigidly interconnected by a center cross member 28 which is braced by a plurality of struts 30.

Each rail 16 and 18 has rigidly attached thereto at both the front and rear ends thereof an energy absorbing bumper support unit, not shown, including a support tube 32 adapted for longitudinal retraction into the corresponding one of the horns in an energy absorbing mode. For a full and complete description of an energy absorbing bumper support unit which can be incorporated into the vehicle 10, reference may be made to copending application Ser. No. 91,008, filed Nov. 19, 1970 and assigned to the assignee of this invention. Each of the support tubes 32 projecting from the horns 20 and 22 is rigidly connected to a front collision bumper bar 34 which is thereby supported on the frame 14 for bodily movement from an extended position, FIGS. 1 and 4, to a retracted position, not shown. Similarly, each of the support tubes 32 projecting from the rearward ends of the rails 16 and 18 is rigidly connected to a rear bumper bar 36 which is thereby supported on the frame 14 for bodily movement from an extended position, FIGS. 1 and 4, to a retracted position, not shown.

Each of the front and rear bumper bars 34 and 36 has associated therewith a movement equalizing arrangement including a torque tube disposed within a transverse housing 38, a first pair of arms 40 rigidly attached to the torque tube at the opposite ends thereof, and a second pair of arms 42 hingedly attached to respective ones of the bumper bars, as at 44, and to corresponding ones of the first pair of arms 40 to 46. When either of the bumper bars is impacted asymmetrically, the arms 40 and 42 nearest the impact transmit the motion of that side of the bumper bar through the torque tube and the opposite side arms 40 and 42 to the opposite side of the bumper bar so that the latter always moves from the extended toward the retracted position in a generally transverse orientation thereby to effect equal distribution of the bumper impact between the energy absorbing bumper support units.

As seen best in FIGS. 1, 2 and 4, the body 12 includes generally a front sheet metal portion 48, a rear sheet metal portion 50, and a passenger compartment 52 disposed therebetween. The passenger compartment 52 is bounded on the top by a roof structure 54, on the bottom by a generally horizontal floor structure, not shown, at the front by a cowl structure 56, and at the rear by the rear sheet metal portion 50. The central portion of the roof structure is rigidly connected to the floor structure by a pair of laterally spaced vertical center posts 58 and the rear margin of the roof structure is rigidly connected to the rear sheet metal portion 50 by a pair of laterally spaced sail panel structures, only left sail panel structure 60 being shown in FIGS. 1 and 4. At the front, the roof structure is connected to the cowl structure by a pair of posts 61 which function only as window supports for a front windshield 63. The center posts 58 cooperate at the top with the roof structure, at the bottom with the respective ones of a pair of rocker panel structures, only left rocker panel structure 62 being shown in FIGS. 1 and 4, at the front with the cowl structure 56, and at the rear with the sheet metal portion 50 and the sail panel structures in defining a pair of laterally spaced front door openings 64 and a pair of laterally spaced rear door openings 66.

As seen best in FIG. 4, the front sheet metal portion 48 includes an outer skin defining a pair of laterally spaced fenders 68. Below the outer skin, the front sheet metal portion further includes a pair of reinforcing members 70 and 72 each of which includes a portion defining a wheel housing 74 and a portion defining a main channel 76 having a branch channel 78 rigidly connected thereto each extending longitudinally above the wheel housing. The main and branch channels of each of the reinforcing members 70 and 72 are rigidly interconnected by a rigid lateral connecting member 80 which is disposed generally in a transverse plane passing through the front ends of the horns 20 and 22. The rear ends of the main channels 76 are rigidly attached to the cowl structure 56 at 82 while the wheel housings 74 are connected to the cowl structure at 84. Accordingly, any longitudinally directed forces imposed on the connecting member 80 are transmitted by the channels 76 and 78 and the wheel housings to the cowl structure, the latter being reinforced therewithin by conventional bracing techniques for a purpose more fully described hereinafter to withstand forces of predetermined magnitude without collapsing.

As seen best in FIGS. 1 and 4, the rear sheet metal portion 50 of the body includes an outer skin defining a left quarter panel 86, a similar right quarter panel, not shown, being formed on the opposite side. The outer skin has a corrugated under portion, not shown, which provides substantial structural rigidity to the skin. Under the outer skin, the rear sheet metal portion includes a further portion defining a structurally rigid left rear wheel housing 88, a similar right rear wheel housing, not shown, being disposed on the opposite side of the body. The forward portion of each rear wheel housing generally defines the lower half of rear marginal edge of a corresponding one of the rear door openings 66 and each wheel housing is rigidly connected to the outer skin of the rear sheet metal portion 50 and to the corresponding one of the sail panel structures so that a substantially rigid structural unit is defined rearward of the passenger compartment.

Referring again to FIGS. 1 and 4, the body 12 is adapted for substantially rigid connection by conventional means to the frame 14 with the rocker panels generally overlying corresponding ones of the rails 16 and 18. So mounted, the front sheet metal portion 48 cooperates with the frame in defining an engine compartment between the fenders adapted to receive an engine-transmission unit, not shown, which is generally rigidly attached to the frame at the front and center cross members 26 and 28. Further, the engine compartment is adapted to be closed by a hood member, not shown, pivotally mounted on the front sheet metal portion for movement between an open position and a closed position generally flush with the tops of the front fenders. A plurality of releasable fasteners are employed between the front sheet metal portion and the hood to maintain the latter in the closed position and to structurally integrate the hood into the front sheet metal portion for a purpose which will become more apparent hereinafter. The front and rear wheel housings overlie predetermined portions of the frame and receive respective ones of a plurality of conventionally supported and driven road wheels 90. For the particular vehicle illustrated, the location of the c.g. is approximately that indicated by reference numeral 91 in FIG. 1.

Referring to FIGS. 1 and 2 and describing only the left side of the passenger compartment, it being understood that the right side is substantially identical, each of the door openings is adapted to be closed by a door swingably mounted on the body. More particularly, at the left side of the cowl structure there is rigidly mounted a large hinge plate 92 which supports a pair of vertically spaced hinge leafs 94 for pivotal movement about respective ones of a pair of hinge pins 96. Each of the hinge leafs 94 straddles the inboard and outboard sides of a front impact beam 98 at the forward end of the latter thereby to support the impact beam on the cowl structure for swinging movement. The beam 98 extends generally the full width of door opening 64 and at the rearward end thereof has rigidly connected thereto a generally L-shaped bracket 100 extending inboard from the beam. The beam 98 differs from conventional side door impact beams in that it is particularly adapted for substantial column rigidity. As seen best in FIG. 3, the beam is generally rectangular in cross section and includes a plurality of integral internal webs 102 which cooperate with the rectangular configuration in effecting the column rigidity. Of course, the beam 98 also possesses substantial bending rigidity necessary in the event of side impacts. A door 104, including an outer panel 106 and an inner panel 108 hem flanged to the outer panel, is rigidly connected to the impact beam 98 and is thereby supported on the body 12 for swinging movement between a closed position, FIGS. 1, 2 and 4, and an open position, not shown.

As seen best in FIG. 2, in the closed position of the door the bracket 100, which extends over the full height of the impact beam 98, is juxtaposed with the forward edge of the center post 58. A latch striker pin 110 rigidly attached to the center post projects into the bracket 100 through an appropriate slot in the rear edge of the door which also permits free swinging of the door. A latch assembly designated generally 112 is mounted on the door within the bracket 100 and releasably engages the striker pin to normally retain the door in the closed position. The latch assembly is generally conventional in construction and corresponds in structure and operation to the assembly disclosed in copending application Ser. No. 84,763, filed Oct. 28, 1970 and assigned to the assignee of this invention. The components of the latch assembly 112 are, however, made somewhat larger and stronger than those of the corresponding assembly disclosed in the application referred to thereby to more easily withstand the forces applied thereto as described hereinafter.

Referring again to FIGS. 1 and 2, a hinge plate 114 is rigidly attached by conventional means to the outboard edge of the center post 58 and supports a pair of pivot pins 116 which, in turn, pivotally support a second pair of vertically spaced hinge leafs 118. The plate 114 has an outwardly extending flange 120 which is disposed generally in longitudinal alignment with the impact beam 98. The hinge leafs 118 straddle the inboard and outboard surfaces of a second impact beam 122 and are rigidly attached to the latter at the top and bottom thereof so that the impact beam 122 is supported on the body for swinging movement into and out of the rear door opening 66. The beam 122, structurally identical to beam 98, extends generally across the full width of the door opening 66 and has rigidly attached to the rearward end thereof an L-shaped bracket 124 similar to bracket 100 on the impact beam 98. A second door 126, including an outer panel 128 and an inner panel 130 hem flanged to the outer panel, is rigidly attached to the impact beam 122 and is thereby supported on the body 12 for swinging movement between a closed position in the door opening 66, FIGS. 1, 2 and 4, and an open position, not shown. A second latch striker pin 132 is rigidly supported by conventional means, not shown, on the rear sheet metal portion 50 and projects from the rear marginal edge of the door opening 66 into the door 126 through an appropriate slot therein which also permits free swinging movement of the door. A second latch assembly designated generally 134 is rigidly mounted on the door 126 and releasably engages the pin 132 thereby to maintain the door 126 in the closed position. The latch assembly 134 corresponds in structure and operation to the assembly disclosed in copending application Ser. No. 89,686, filed Nov. 16, 1970 and assigned to the assignee of this invention. The components of the latch assembly 134 are, however, made somewhat larger and stronger than those of the corresponding assembly disclosed in the application referred to thereby to more easily withstand the forces applied thereto as described hereinafter.

Describing now the overall performance of the frame and body construction according to this invention assuming that the vehicle, traveling at a velocity of approximately 50 miles per hour, engages a rigid barrier in a frontal impact type collision, the initial effect is rearward displacement of the front bumper bar 34 from the extended to the retracted position during which displacement the leading edge of the front sheet metal portion forward of the lateral connecting member 80 is deformed and a relatively small portion of the kinetic energy of the vehicle is dissipated. Due to its initial high velocity, the vehicle continues toward the barrier thus initiating direct engagement between the lateral connecting member and the barrier at virtually the same instant the front ends of the horns 20 and 22 engage the barrier. At the instant of simultaneous engagement, longitudinally directed forces of substantial magnitude are exerted by the barrier on the channels 76 and 78 and on each of the horns 20 and 22. Longitudinal forces of somewhat lower magnitude are also exerted on the hood and the fenders. This distribution of forces between the frame, the channels, the hood, and the fenders functions to divide the barrier impact forces vertically into longitudinal forces acting on the vehicle body above and below the c.g. Accordingly, the tendency of the vehicle to pitch with consequent lifting of the rear end off of the ground due to inertia is effectively neutralized and the vehicle maintains a substantially horizontal attitude during impact. In practice, a distribution of the impact forces between the frame 14 and the remaining elements of the front sheet metal portion 48 in the amount of approximately ⅔ to the frame and ⅓ to the sheet metal portion provides satisfactory pitch suppression.

Generally at the instant of direct engagement between the barrier and the horns and the lateral connecting member, the longitudinal forces experienced by the horns 20 and 22 and the channels 76 and 78 very rapidly build to a predetermined magnitude at which instant permanent deformation commences in the channels and horns. Subsequently, the magnitude of the force remains fairly constant at the predetermined level which is equal to the magnitude previously determined as being necessary to stop the vehicle in the given distance. The forces experienced by the channels are, of course, transferred to the cowl structure 56 as are the longitudinal forces experienced by the hood and the fenders. Typically, the cowl structure does not have sufficient strength to withstand these forces without collapse nor, because of the door openings, is it sufficiently longitudinally reinforced to avoid rearward deflection with consequent penetration of the passenger compartment. In the construction according to this invention, however, the cowl structure itself is internally braced, as described hereinbefore, to withstand forces of the predetermined magnitude without collapsing. Further, the impact beams, mounted as described hereinbefore, function to provide the necessary longitudinal reinforcement for the cowl structure.

Referring particularly to FIGS. 1 and 2, the forces tending to displace the cowl structure rearward are transferred to the impact beam 98 through the plate 92, the pins 96, and the leafs 94 and urge the latter slightly rearward until the bracket 100 abuts the front of the center post and the beam abuts the flange 120. The door opening 64 is thus bridged by the beam 98 with the longitudinal forces being transferred to the center post. Similarly, the longitudinal forces on the center post are transferred through the plate 114, the pins 116, and the leafs 118 to the impact beam 122. This initiates slight rearward displacement of the beam 122 until the rearward edge thereof and the bracket 124 seat on the rear marginal edge of the door opening 66 which edge, of course, is a structurally rigid portion of the rear sheet metal portion 50 of the body. Accordingly, the cowl structure is connected to the rear sheet metal portion by a plurality of elements presenting a longitudinally structurally rigid link and penetration of the passenger compartment is thus prevented. The impact beams 98 and 122, of course, while providing longitudinal rigidity also function in a conventional manner to inhibit passenger compartment penetration during side impact type collisions.

With respect to longitudinal forces on each of the beams 98 and 122, the latch assemblies function to prevent separation of the rear edge of the corresponding one of the doors 104 and 126 from the center post and the rear sheet metal portion respectively. This, of course, requires that the component parts of the latch assembly be somewhat stronger than normally used. The latch assemblies are not, however, longitudinal load bearing members.

As simultaneous deformation or collapse of the horns and the front sheet metal portion continues, progressively more of the kinetic energy of the vehicle is dissipated or absorbed as work required to effect metal deformation. After a predetermined amount of deformation, direct contact is effected between the front of the engine and the barrier whereupon a portion of the longitudinal force exerted on the vehicle is transmitted through the engine and rear engine mounts, not shown, to the center cross member 28 thus initiating further energy absorbing deformation at the struts 30. When the amount of energy absorbed during deformation of the frame and the front sheet metal portion of the body equals the kinetic energy of the vehicle, the latter achieves zero velocity and comes to rest.

Having thus described the invention, what is claimed is:

1. In a vehicle including a body portion having a passenger compartment and a structurally rigid sheet metal portion disposed rearward of said passenger compartment, said passenger compartment having a side wall including a door opening extending generally the full height of said passenger compartment adapted for closure by a door swingably supported on said body portion, and further including frame means attached to said body portion and extending forwardly of said passenger compartment generally in a horizontal plane below the center of gravity of said vehicle, said frame means being adapted for permanent deformation in an energy absorbing mode at a predetermined rate under an impact to the forward portion of said vehicle, the improvement comprising, means defining a rigid cowl structure disposed forward of said passenger compartment and in juxtaposition to one marginal edge of said door opening, a front sheet metal portion rigidly attached to said cowl structure and defining a pair of reinforced front fender members disposed above said frame means generally in a horizontal plane above the center of gravity of said vehicle, said front sheet metal portion being adapted for permanent deformation in an energy absorbing mode at a predetermined rate under an impact to the forward portion thereof and cooperable with said frame means in distributing an impact force at the front of said vehicle above and below the center of gravity of the latter in a predetermined ratio thereby to retard pitching of said vehicle, a load transfer member having substantial column rigidity pivotally supported on said body at least partially above a horizontal plane containing the center of gravity of said vehicle for movement as a unit with said door between an inoperative position corresponding to the open position of said door and an operative position corresponding to the closed position of said door wherein said transfer member is disposed generally horizontally across the full width of said door opening, means disposed between said cowl structure and said transfer member providing a longitudinally rigid connection therebetween, and means on said rear sheet metal portion defining a structurally rigid surface adapted for engagement on the rear marginal edge of said transfer member in response to impact at the front of said vehicle thereby to prevent rearward displacement of said transfer member and rearward displacement of said cowl structure.

2. In a vehicle including a body portion having a passenger compartment and a structurally rigid sheet metal portion disposed rearward of said passenger compartment, said passenger compartment having a side wall including a door opening extending generally the full height of said passenger compartment adapted for closure by a door swingably supported on said body portion, and further including frame means attached to said body portion and extending forwardly of said passenger compartment generally in a horizontal plane below the center of gravity of said vehicle, said frame means being adapted for permanent deformation in an energy absorbing mode at a predetermined rate under an impact to the forward portion of said vehicle, the improvement comprising, means defining a rigid cowl structure disposed forward of said passenger compartment and in juxtaposition to one marginal edge of said door opening, a front sheet metal portion rigidly attached to said cowl structure and including an outer skin defining a pair of front fender members and internal reinforcing means defining a channel within each of said fender members extending longitudinally of said vehicle generally in a horizontal plane disposed above the center of gravity of said vehicle, said outer skin and said reinforcing channels being adapted for permanent deformation in an energy absorbing mode at a predetermined rate under an impact to the forward portion thereof and cooperable with said frame means in distributing an impact force at the front of said vehicle above and below the center of gravity of the latter in a predetermined ratio thereby to retard pitching of said vehicle, an elongated load transfer beam having substantial column rigidity, hinge means disposed between said cowl structure and said beam adapted to support the latter on said body portion with at least a portion of said beam situated above a horizontal plane containing the center of gravity of said vehicle for pivotal movement as a unit with said door between an inoperative position corresponding to the open position of said door and an operative position corresponding to the closed position of said door wherein said beam is disposed generally horizontally across the full width of said door opening, reinforcement means in said hinge means operative to provide substantial longitudinal rigidity to the connection between said cowl structure and said beam, and means on said rear sheet metal portion defining a structurally rigid surface adapted for engagement on the rear marginal edge of said transfer member in response to an impact at the front of said vehicle thereby to prevent rearward displacement of said transfer member and rearward displacement of said cowl structure.

3. In a vehicle, the combination comprising, a body member, means on said body member defining a passenger compartment having a side wall including a front door opening and a rear door opening separated by a center pillar, each of said door openings extending generally the full height of said passenger compartment, means on said body member defining a structurally rigid rear sheet metal portion disposed rearwardly of said passenger compartment, said rear sheet metal portion being juxtaposed with at least part of the rear marginal edges of said rear door opening thereby to provide a structurally rigid abutment surface in said rear door opening, a reinforced cowl structure rigidly attached to said body member forward of said passenger compartment in juxtaposition with at least a portion of the forward marginal edge of said front door opening, a frame member having a pair of longitudinally oriented horns, means generally rigidly attaching said frame member to said body member with said horns being disposed forwardly of said passenger compartment in a generally horizontal plane situated below the center of gravity of said vehicle, each of said horns being adapted for permanent deformation in an energy absorbing mode at a predetermined rate under an impact at the forward portion of said vehicle, a front sheet metal portion including an outer skin defining a pair of laterally spaced front fender members and reinforcement means below said outer skin defining a channel in each of said fender members extending longitudinally generally in a horizontal plane above the center of gravity of said vehicle, means rigidly attaching said front sheet metal portion to said cowl structure, said outer skin and said channels being adapted for permanent deformation in an energy absorbing mode at a predetermined rate under an impact to the forward portion thereof and cooperable with said frame member horns in distributing an impact force at the front of said vehicle above and below the center of gravity of the latter in a predetermined ratio of approximately ⅔ to said frame member and ⅓ to said sheet metal portion thereby to retard pitching of said vehicle, a rigid laterally extending connecting member disposed between said channels and adapted to effect equal permanent deformation of each, a first side impact beam having substantial column rigidity, a first hinge member disposed between said cowl structure and said first beam supporting the latter on said cowl structure for pivotal movement between an inoperative position and an operative position disposed in said front door opening in a generally horizontal attitude between the front marginal edge of said opening and said center pillar, means in said first hinge member adapted to effect a substantially longitudinally rigid connection between said beam and said cowl structure in the operative position of the former so that longitudinally directed forces on said cowl structure are transferred by said beam to said center pillar, a second side impact beam having substantial column rigidity, a second hinge member disposed between said center pillar and said second beam supporting the latter on said center pillar for pivotal movement between an inoperative position and an operative position disposed in said rear door opening in a generally horizontal attitude between said center pillar and said abutment surface, means in said second hinge member adapted to effect a substantially longitudinally rigid connection between said beam and said center pillar in the operative position of the former so that longitudinally directed forces on said center pillar are transferred by said second beam to said abutment surface thereby to prevent rearward displacement of said center pillar and said first beam and said cowl structure, means defining a front door structure rigidly attached to said first beam and supported by the latter on said body for pivotal movement between an open position and a closed position corresponding respectively to the inoperative and the operative positions of said first beam, and means defining a second door structure rigidly attached to said second beam and supported by the latter on said body for pivotal movement between an open position and a closed position corresponding respectively to the inoperative and the operative positions of said second beam.

* * * * *